US010134282B2

(12) United States Patent
Tsuruta et al.

(10) Patent No.: US 10,134,282 B2
(45) Date of Patent: Nov. 20, 2018

(54) ON-VEHICLE TRACKING CONTROL APPARATUS

(71) Applicant: DENSO CORPORATION, Kariya, Aichi-pref. (JP)

(72) Inventors: Tomohiko Tsuruta, Aichi-ken (JP); Motonori Tominaga, Anjo (JP); Yusuke Ueda, Nishio (JP); Takeshi Hatoh, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 13/772,844

(22) Filed: Feb. 21, 2013

(65) Prior Publication Data

US 2013/0226402 A1    Aug. 29, 2013

(30) Foreign Application Priority Data

Feb. 23, 2012  (JP) .................................. 2012-037538

(51) Int. Cl.
  *G08G 1/16*     (2006.01)
  *B60W 30/16*    (2012.01)

(52) U.S. Cl.
  CPC ............. *G08G 1/166* (2013.01); *B60W 30/16* (2013.01)

(58) Field of Classification Search
  CPC ...... B60W 30/10; B60W 30/14; B60W 30/16; B60W 30/165; G08G 1/166
  See application file for complete search history.

(56) References Cited

U.S. PATENT DOCUMENTS

| 6,805,216 B2 * | 10/2004 | Noecker ............ B60K 31/0008 180/170 |
| 8,903,638 B2 * | 12/2014 | Lin et al. ....................... 701/301 |
| 2003/0156015 A1 * | 8/2003 | Winner et al. ............. 340/425.5 |
| 2003/0163239 A1 * | 8/2003 | Winner et al. .................. 701/93 |

(Continued)

FOREIGN PATENT DOCUMENTS

| DE | 10159658 A1 | 6/2003 |
| DE | 10358034 A1 | 7/2005 |

(Continued)

OTHER PUBLICATIONS

Office Action dated Jan. 5, 2016 in corresponding Japanese Application No. 2012-037538 with English translation.

*Primary Examiner* — Jelani A Smith
*Assistant Examiner* — Kelly D Williams
(74) *Attorney, Agent, or Firm* — Harness, Dickey & Pierce, P.L.C.

(57) ABSTRACT

A tracking control apparatus for tracking a preceding vehicle includes information acquiring unit for acquiring information about surrounding the own vehicle, preceding vehicle determining unit for determining the preceding vehicle running ahead of the own vehicle, control unit controls the tracking control to be maintained or released, and turn signal determining unit for determining whether or not a turn signal of a turn signal unit of the preceding vehicle is active. The control unit maintains or releases the tracking control by determining the surrounding of the own vehicle concerning a traffic lane change by the preceding vehicle based on the information acquired by the information acquiring unit, when the turn signal determining unit determines that the turn signal of the turn signal unit is active.

13 Claims, 6 Drawing Sheets

(56) References Cited

U.S. PATENT DOCUMENTS

| | | | |
|---|---|---|---|
| 2004/0064241 A1* | 4/2004 | Sekiguchi | 701/96 |
| 2005/0043879 A1 | 2/2005 | Desens et al. | |
| 2005/0134440 A1* | 6/2005 | Breed | 340/435 |
| 2006/0167620 A1* | 7/2006 | Takagi et al. | 701/200 |
| 2007/0142995 A1 | 6/2007 | Wotlermann | |
| 2007/0150196 A1* | 6/2007 | Grimm | 701/301 |
| 2008/0270018 A1* | 10/2008 | Citelli | 701/200 |
| 2009/0105953 A1* | 4/2009 | Sugano et al. | 701/301 |
| 2009/0204304 A1* | 8/2009 | Urban et al. | 701/96 |
| 2010/0057321 A1* | 3/2010 | Randier et al. | 701/96 |
| 2010/0198478 A1* | 8/2010 | Shin | 701/96 |
| 2011/0010094 A1* | 1/2011 | Simon | 701/301 |
| 2012/0083960 A1* | 4/2012 | Zhu et al. | 701/23 |
| 2012/0109421 A1* | 5/2012 | Scarola | 701/2 |
| 2012/0226433 A1* | 9/2012 | Hasan et al. | 701/112 |
| 2012/0314070 A1* | 12/2012 | Zhang et al. | 348/148 |
| 2014/0005907 A1* | 1/2014 | Bajpai | 701/96 |
| 2014/0005908 A1* | 1/2014 | Kollberg et al. | 701/96 |

FOREIGN PATENT DOCUMENTS

| | | |
|---|---|---|
| JP | 11-321377 | 11/1999 |
| JP | 2004-322916 | 11/2004 |
| JP | 2007-186096 | 7/2007 |
| JP | 2009-126190 | 6/2009 |

\* cited by examiner

|  | CAMERA | MILLIMETER WAVE RADAR EQUIPMENT | LASER RADAR EQUIPMENT | SONAR EQUIPMENT |
|---|---|---|---|---|
| PRECEDING VEHICLE DETECTOR | ○ | ○ | ○ |  |
| TURN SIGNAL DETECTOR | ○ |  |  |  |
| TRAFFIC LANE DETECTOR | ○ |  | ○ |  |
| LATERAL VEHICLE DETECTOR | ○ |  | ○ | ○ |

FIG.5

ON-VEHICLE TRACKING CONTROL APPARATUS

CROSS-REFERENCE TO RELATED APPLICATION

This application is based on and claims the benefit of priority from earlier Japanese Patent Application No. 2012-37538 filed on Feb. 23, 2012 the description of which is incorporated herein by reference.

BACKGROUND

Technical Field

The present disclosure relates to a control apparatus for vehicles, and more particularly to an on-vehicle tracking control apparatus for a tracking a preceding vehicle by controlling a traveling speed of the own vehicle so as to track a preceding vehicle.

Description of the Related Art

Conventionally, an on-vehicle tracking control apparatus has been known. The on-vehicle tracking control apparatus is adapted to automatically track a preceding vehicle by controlling a traveling speed of the own vehicle. For example, when the on-vehicle tracking control apparatus recognizes a preceding vehicle, the control apparatus performs a tracking control to track the preceding vehicle, and when the on-vehicle tracking control apparatus does not recognize any preceding vehicle, the control apparatus performs a traveling control in which the traveling speed is maintained at a predetermined traveling speed.

In recent years, an accuracy of this type of apparatus is required to be more improved. In this respect, to avoid causing discomfort to the driver caused by unnecessary tracking control, Japanese Patent Application Laid-Open Publication No. 2009-126190 discloses an on-vehicle tracking control apparatus that acquires information about turn signals of the preceding vehicle so as to change a threshold value used for releasing a tracking operation. According to this on-vehicle tracking control apparatus, when the turn signal of the preceding vehicle is active, the tracking control can be released earlier.

However, continuation and releasing the tracking control after acquiring the information about the turn signal may vary depending on the relationship between the own vehicle and other vehicles other than the preceding vehicle. For instance, even when the on-vehicle tracking control apparatus continues to perform the tracking control, depending on the relationship between the own vehicle and the other vehicles, the tracking control may be released because of a safety reason. In other word, only changing the threshold value of the tracking control as described in the above patent document may be not sufficient.

SUMMARY

The embodiment provides an on-vehicle tracking control apparatus capable of reliably continuing or releasing the tracking control based on the relationship between the own vehicle and the other vehicles after acquiring information about the turn signal of the preceding vehicle.

As a first aspect of the present disclosure, an on-vehicle tracking control apparatus is provided with information acquiring means and control means.

The information acquiring means includes preceding vehicle determining means and acquires information about the surroundings of the own vehicle. Moreover, the control means is configured to maintain or release the tracking control when performing the tracking control of a preceding vehicle identified by the preceding vehicle determining means.

Especially, according to the present disclosure, turn signal determining means determines whether or not a turn signal of the turn signal unit of the preceding vehicle is active. When the turn signal determining means determines the turn signal is active, the control means takes into account the surrounding of the own vehicle concerning a traffic lane change of the preceding vehicle based on the information about the surrounding acquired by the information acquiring means so as to maintain or release the tracking control.

As described above, controlling the tracking control to be maintained or released after acquiring the information about the turn signal unit is influenced by a relationship with vehicles other than the preceding vehicle as well. Therefore, after acquiring the information about the turn signal unit of the preceding vehicle, the tracking control can be reliably maintained or released considering the relationship between the own vehicle and the other vehicles.

DETAILED DESCRIPTION OF THE PREFERRED EMBODIMENTS

Figure 1:
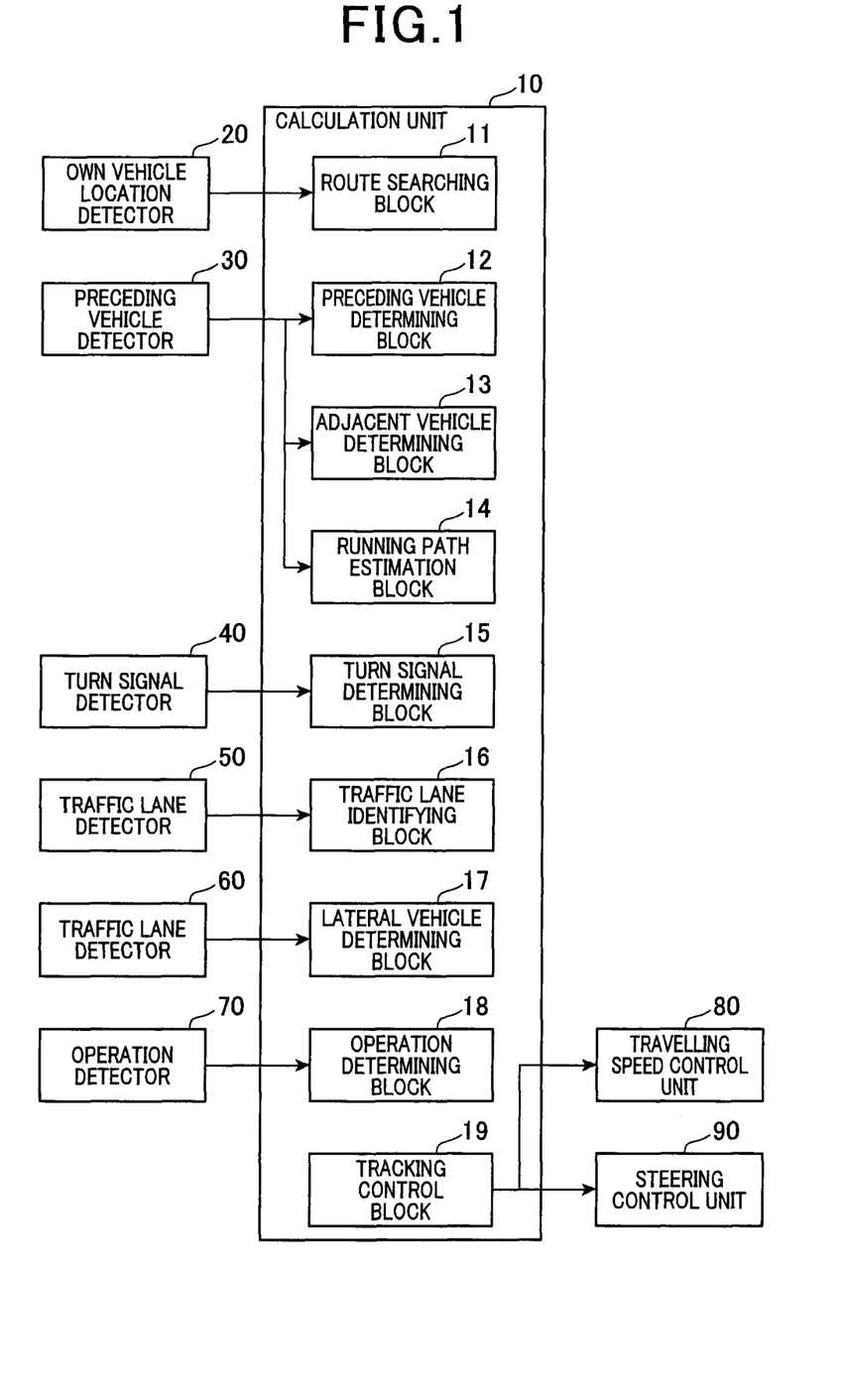
FIG. 1 is a block diagram showing an overall configuration of the on-vehicle tracking control apparatus.

With reference to the drawings, hereinafter is described an embodiment of the present disclosure. As shown in FIG. 1, the on-vehicle tracking control apparatus of the embodiment includes a calculation unit as a main unit and its peripheral units. The calculation unit 10 is constituted by a computer including a CPU (central processing unit), ROM (Read Only Memory), RAM (Random Access Memory), I/O (input and output) and a bus line that connects these units. In the calculation unit 10, an own vehicle location detector 20, a preceding vehicle detector 30, a turn signal detector 40, a traffic lane detector 50, a lateral vehicle detector 60, an operation detector 70, a traveling speed control unit 80 and a steering control unit 90 are connected.

The own vehicle location detector 20 is constituted by a GPS (Global Positioning System) receiver, a magnetic sensor, a gyroscope and a distance sensor. The GPS receiver receives a transmission signal from the satellite and detects an altitude and a position coordinate. The magnetic sensor detects the direction of the vehicle based on the magnetic field. The gyroscope outputs a detection signal in response to the angular velocity of a rotary movement applied to the vehicle. Moreover, the distance sensor outputs the running distance of the vehicle. Accordingly, the calculation unit 10 can calculate the present location, the direction and the traveling speed of the vehicle. Also, the calculation unit 10 is capable of searching a traveling route from the current location to the destination (described later).

The calculation unit 10 acquires information about the surroundings of the own vehicle from the preceding vehicle detector 30, the turn signal detector 40, the traffic lane detector 50 and the lateral vehicle detector 60, and determines the surrounding of the vehicle. The detection range of the respective detectors 30, 40, 50 and 60 and a configuration thereof is described hereinbelow.

Figure 2:
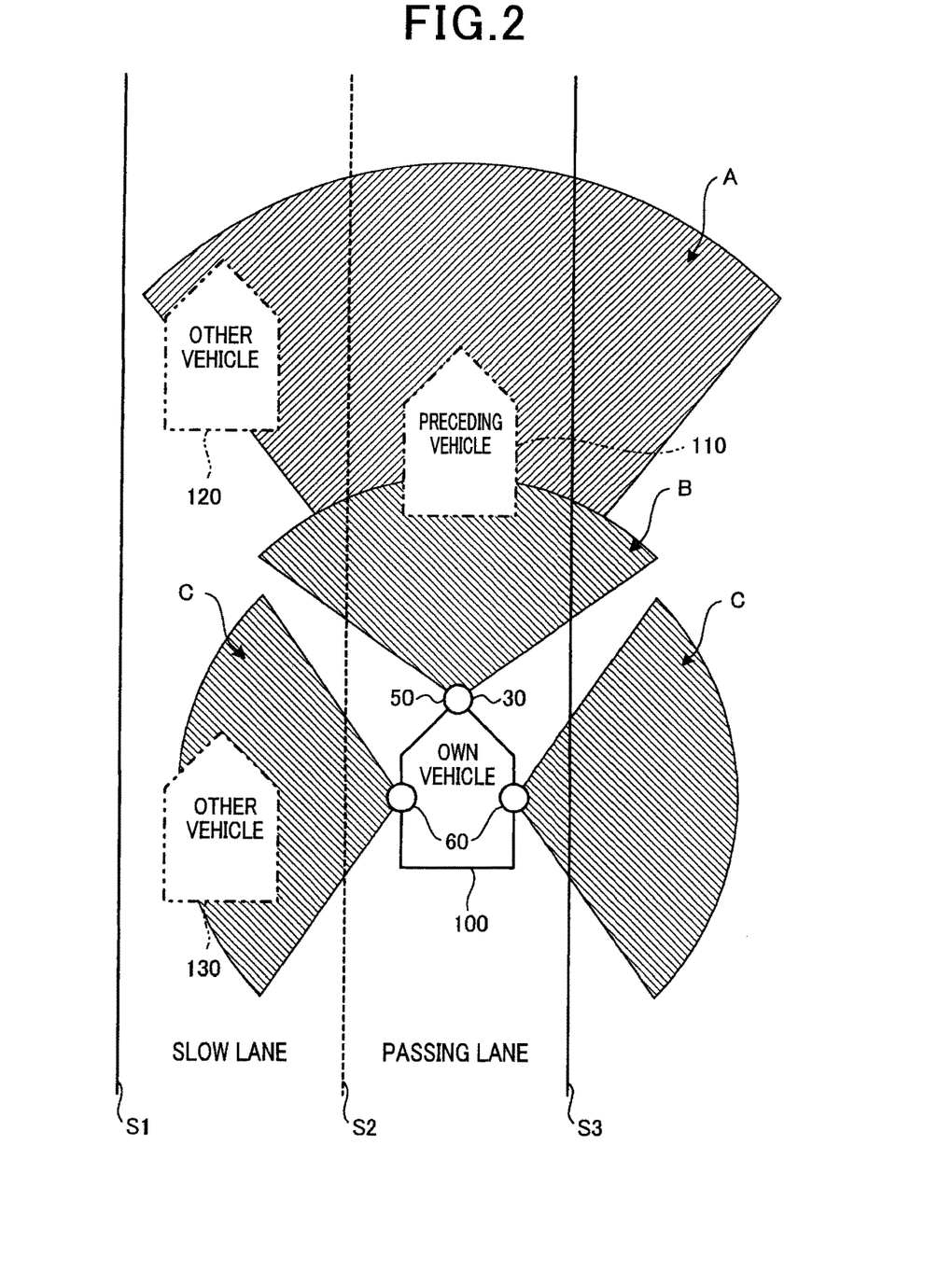
FIG. 2 is an explanatory diagram showing a detector mounted on the own vehicle and the detection range of the detector.

As shown in FIG. 2, it is assumed that the vehicle is running on an expressway having a slow lane and a passing lane. The slow lane and the passing lane are separated by traffic lane dividing lines S1, S2 and S3 and the own vehicle 100 is running on the passing lane.

The preceding vehicle detector 30 is disposed at a front portion of the own vehicle 100 and detects vehicles within a range indicated by the symbol A as shown in FIG. 2. For example, the preceding vehicle detector 30 detects the preceding vehicle 110 running ahead of the own vehicle in the same passing lane where the own vehicle 100 is running and detects other vehicle 120 running on an adjacent slow lane.

The traffic lane detector 50 is disposed in the front portion of the own vehicle 100 similarly to the preceding vehicle detector 30 and detects a traffic lane dividing lines S2 and S3 in a range indicated by the symbol B. As a result, the traffic lane where the own vehicle is running can be identified and a change of lane by the preceding vehicle 110 can be detected based on the detected traffic lane dividing lines S2 and S3.

The lateral vehicle detector 60 is disposed in both right and left side portions in the own vehicle 100 and detects the vehicle in a range indicated by the symbol C. For example, the lateral vehicle detector 60 detects other vehicles 130 running parallel to the own vehicle 100, whereby the vehicle running parallel to the own vehicle 100 can be detected.

The turn signal detector 40 is employed so as to detect flashing of the turn signal unit of the preceding vehicle 110. The detection range is not illustrated in FIG. 2, however, the detection range is in front of the own vehicle 100.

Figure 3:
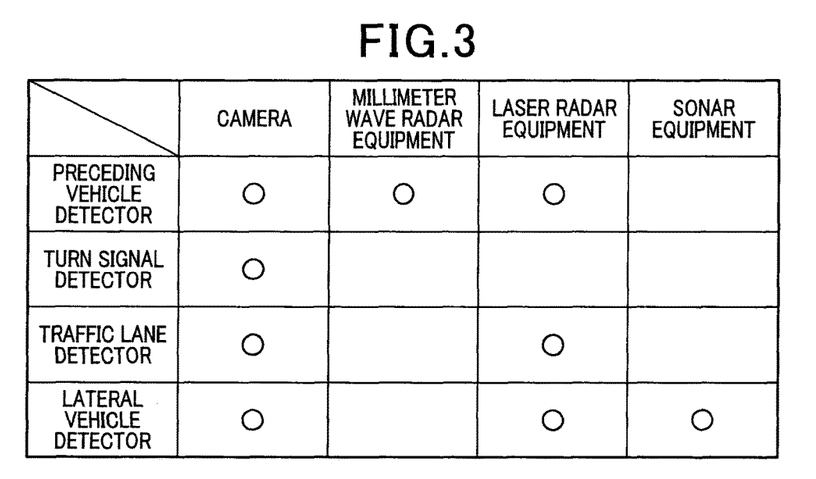
FIG. 3 is an explanatory diagram showing apparatuses capable of executing functions corresponding to the respective detectors.

As shown in FIG. 3, the preceding vehicle detector 30 can be embodied by a camera, millimeter wave radar equipment and laser radar equipment. The turn signal detector 40 can be embodied by a camera. Further, the traffic lane detector 50 can be embodied by a camera, and the laser radar equipment. The lateral vehicle detector 60 can be embodied by a camera, laser radar equipment, and sonar equipment. Also, in addition to these configurations, depending on the objects to be detected, an inter-vehicle communication or a road-to-vehicle communication can be used for detecting the objects.

With reference to FIG. 1, the operation detector 70 is employed to confirm a driver's intention. For example, the operation detector 70 can be embodied by a switch unit or a touch panel. The traveling speed control unit 80 and the steering control unit 90 is a configuration used for controlling the traveling speed and the steering whereby the tracking control can be performed. Next, a function of the calculation unit 10 is now described. The calculation unit 10 includes nine functional blocks: a route searching block 11, a preceding vehicle determining block 12, an adjacent vehicle determining block 13, a running path estimation block 14, a turn signal determining block 15, a traffic lane identifying block 16, a lateral vehicle determining block 17, an operation determining block 18 and a tracking control block 19.

The route searching block 11 is adapted to search a traveling route from a current location which is outputted by the own vehicle location detector 20 to a destination set in advance. Hence, the route searching block 11 is capable of using map information which is not shown.

The preceding vehicle determining block 12 determines that a preceding vehicle is running on the same traffic lane where the own vehicle is running based on the information from the preceding vehicle detector 30. According to an example as shown in FIG. 2, the preceding vehicle determining block 12 detects the preceding vehicle 110 which is running on the same passing lane where the own vehicle 100 is running.

The adjacent vehicle determining block 13 detects other vehicles running parallel to the preceding vehicle on an adjacent traffic lane based on the information outputted from the preceding vehicle detector 30. According to the example as shown in FIG. 2, the adjacent vehicle determining block 13 detects other vehicles 120 running parallel to the preceding vehicle 110 and running on the slow lane adjacent to the passing lane where the own vehicle is running.

The running path estimation block 14 records the location of the preceding vehicle as history data based on the information from the preceding vehicle detector 30 and estimates a running path of the preceding vehicle immediately after the location is recorded. This function supplements a judgment whether or not the preceding vehicle is running within a traffic lane when the road is curved.

The turn signal determining block 15 determines whether or not the turn signal unit of the preceding vehicle is flashing based on the information from the turn signal detector 40. The information includes a position of the flashing turn signal unit, a pattern of the flashing (an interval of the flashing) and the color of the turn signal unit.

The traffic lane identifying block 16 identifies the traffic lane where the own vehicle is running by detecting the traffic lane dividing lines based on the information from the traffic lane detector 50. According to the example as shown in FIG. 2, the traffic lane identifying block 16 detects the traffic lane dividing lines S2 and S3 and identifies the traffic lane where the own vehicle is running.

The lateral vehicle determining block 17 detects other vehicles on the adjacent traffic lane running parallel to the own vehicle based on the information from the lateral vehicle detector 60. According to the example as shown in FIG. 2, the lateral vehicle determining block 17 detects other vehicles 130 on the adjacent lane running parallel to the own vehicle 100.

The operation determining block 18 determines whether or not the driver operates the switch unit or the touch panel based on the information from the operation detector 70. The operation determining block 18 according to the embodiment determines whether or not the driver's operation indicates continuation of the tracking control when the preceding vehicle changes the traffic lane thereof.

The tracking control unit 19 controls whole part of the on-vehicle tracking control apparatus by using the above-described respective blocks 11 to 18. When the tracking control is performed, the tracking control block 19 issues a command to enable the traveling speed control unit 80 and a steering control unit 90 to operate.

The preceding vehicle determining block 12 and the preceding vehicle detector 30 correspond to preceding vehicle determining means.

The adjacent vehicle determining block 13, the running path estimation block 14, the traffic lane identifying block 16, the lateral vehicle determining block 17, the preceding vehicle detector 30, the traffic lane detector 50 and the lateral vehicle detector 60 correspond to information acquiring means.

The tracking control block 19 corresponds to control means. The turn signal determining block 15 and the turn signal detector 40 correspond to turn signal determining means. The adjacent vehicle determining block 13 and the preceding vehicle detector 30 correspond to adjacent vehicle determining means. The lateral vehicle determining block 17 and the lateral vehicle detector 60 correspond to lateral vehicle determining means. The traffic lane identifying block 16 and the traffic lane detector 50 correspond to traffic lane identifying means. The running path estimation block 14 and the preceding vehicle detector 30 correspond to running path estimation means. The route searching block 11 and the own vehicle location detector 20 correspond to route searching means. The operation detector 70 and the operation detector 70 correspond to intention determining means.

Next, with reference to FIGS. 4, 5, 6A 6B, 6C, 6D and 6E, the tracking judgment process is described as follows. This process is repeatedly executed by the calculation unit 10. At the first step S100, the tracking process detects the turn signal in which flashing of the turn signal unit of the preceding vehicle is detected. As described above, the process determines the flashing of the turn signal based on the position of flashing turn signal unit, the pattern of flashing and the color of the turn signal unit. In this step S100, the process discriminates the turn signal from the use of hazard lamps. In addition, by using the pattern of flashing and the color of the turn signal, the process discriminates between the turn signal of the preceding vehicle and other vehicle's turn signal or a light from the surrounding environment.

Figure 6A:
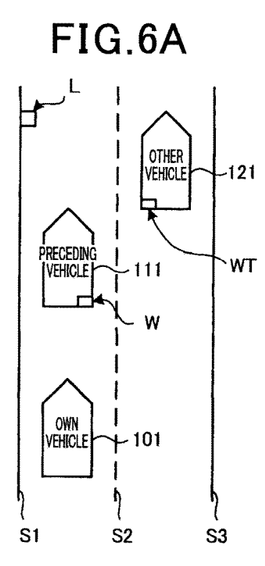
FIGS. 6A, 6B, 6C, 6D and 6E are explanatory diagrams showing specific examples of the tracking judgment process.

For example, as shown in FIG. 6A, there are not only the turn signal unit W of the preceding vehicle 111 running ahead of the own vehicle 101 but also other turn signal WT of other vehicle 121 which is running diagonally to the forward right of the preceding vehicle 111 may be flashing or a road-side light L may be flashing. Accordingly, the process determines the flashing of the turn signal unit W of the preceding vehicle 111 based on the position of the turn signal unit W of the preceding vehicle 111, the pattern of the flashing and the color of the turn signal unit W.

Subsequently, at step S110, it is determined whether or not the turn signal is active. This process determines whether or not the preceding vehicle has activated the turn signal based on the detection result at step S100. The steps S100 and S110 serve as a function of the turn signal determining block 15. When it is determined that the turn signal is activated (S110: YES), the process proceeds to step S120. Meanwhile, when it is determined that the turn signal is not activated (S110: NO), the tracking judgment process is terminated without executing the subsequent processes. In this case, subsequent processes from step S100 are repeatedly executed.

Figure 5:
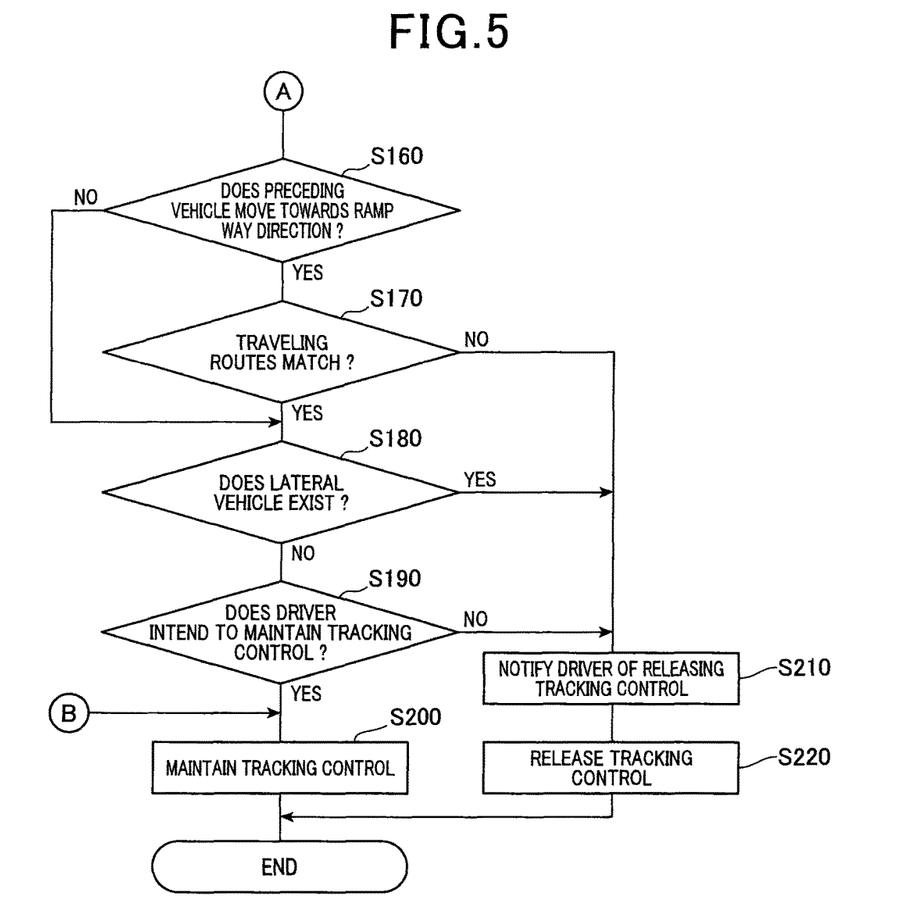
FIG. 5 is a flowchart showing a second half part of the tracking judgment process.
Figure 6B:
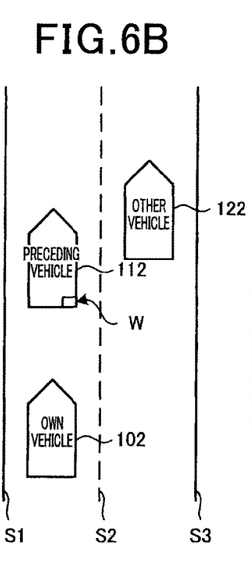

Next at step S120, it is determined whether or not an adjacent vehicle exists. This process serves as a function of the adjacent vehicle determining block 13. At the step S120, it is determined whether or not the other vehicle running parallel to the preceding vehicle is in the adjacent traffic lane. For example, as shown in FIG. 6B, when other vehicle 122 running ahead and to the right of the preceding vehicle 112 which is running ahead of the own vehicle 102 exists, the process determines that the condition is true. When the process determines the adjacent vehicle exists (S120: YES), the process proceeds to step S200 as shown in FIG. 5 and maintains the tracking control, and then terminates the tracking judgment process. According to an example as shown in FIG. 6B, the preceding vehicle 112 is not able to change the traffic lane since other vehicle 122 prevents the preceding vehicle 112 trying to change the traffic lane. Meanwhile, when the process determines the adjacent vehicle does not exist (S120: NO), the process proceeds to step S130.

Figure 6C:
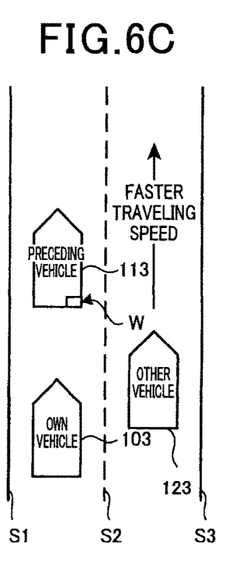
Figure 6D:
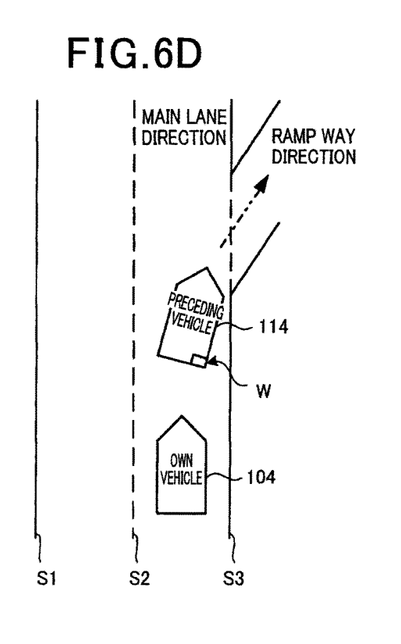

At step S130, it is determined whether or not a lateral vehicle running with faster traveling speed exists. This process is executed by the tracking control block 19 using a function of the lateral vehicle determining block 17. In this step, the process determines that other vehicle running parallel to the own vehicle exists on the adjacent traffic lane and running faster than the own vehicle. As shown in FIG. 6C, when other vehicle 123 which is running in the side direction of the own vehicle 103 exists, the process determines that the condition is true. When the process determines a lateral vehicle having traveling speed faster than that of the own vehicle exists (S130: YES), the process proceeds to step S200 as shown in FIG. 5 and maintains the tracking control, and then terminates the tracking judgment process. According to an example as shown in FIG. 6C, since the other vehicle 123 prevents changing traffic lane by the preceding vehicle 113 after the other vehicle 123 passes the own vehicle 103, it is estimated that the preceding vehicle 113 cannot change the traffic lane. Meanwhile, when the process determines that there are no lateral vehicles having faster traveling speed (S130: NO), the process proceeds to step S140.

At step S140, it is determined whether or not the preceding vehicle is running within a traffic lane. This process is executed by the tracking control block 19 by using the running path estimation block 14 and the traffic lane identifying block 16. As described above, the running path estimation block 14 records the location of the preceding vehicle as history data and estimates a running path of the preceding vehicle immediately after the location is recorded. Hence, the process determines whether or not the preceding vehicle is within a traffic lane if the road is curved. When it is determined the preceding vehicle is not running within the traffic lane (S140: YES), the process proceeds to step S200 as shown in FIG. 5 and maintains the tracking control, and terminates the tracking judgment process. Meanwhile, when it is determined that the preceding vehicle is not running within the traffic lane (S140: NO), the process proceeds to step S150.

At step S150, it is determined that whether or not the preceding vehicle has changed the traffic lane. This process is executed by the tracking control block 19 using the traffic lane identifying block 16. In this step S150, when it is determined the preceding vehicle is moving away from the traffic lane where the own vehicle is running, the process determines that the condition is true. When the process determines the preceding vehicle has changed the traffic lane (S150: NO), that is, the preceding vehicle is running across the traffic lane dividing lines, however, the preceding vehicle is not moving away from the traffic lane where the own vehicle is running, the process proceeds to step S200 as shown in FIG. 5, maintains the tracking control and then terminates the tracking judgment process. Meanwhile, when the process determines the preceding vehicle has changed the traffic lane (S150: YES), the process proceeds to step S160 as shown in FIG. 5.

At step S160 as shown in FIG. 5, it is determined whether or not the preceding vehicle moves towards the ramp way direction. This process is executed by the tracking control block 19 using map information included in the route searching block 11. For example, as indicated by an arrow in FIG. 6D, when the preceding vehicle 114 running ahead of the own vehicle 104 moves towards the ramp way direction from the main lane, the process determines the condition is true. When it is determined that the preceding vehicle moves towards the ramp way direction (S160: NO), the process proceeds to step S170. When it is determined that the preceding vehicle does not move towards the ramp way direction (S160: NO), that is, the preceding vehicle moves to the adjacent traffic lane, the process does not execute step S170 and proceeds to step S180.

At step S170 executed when the process determines the preceding vehicle moves towards the ramp way direction, it is determined whether or not the traveling route of the preceding vehicle is the same as the traveling route of the own vehicle. In this step, when the traveling route set by the route searching block 11 is the same as the traveling route where the preceding vehicle moves towards the ramp way direction, the process determines the condition is true. When the traveling route of the preceding vehicle is the same as the traveling route of the own vehicle (S170: 170), the process proceeds to step S180. Meanwhile, when the process determines the traveling routes are not the same from each other (S170: NO), the process proceeds to step S210 so as to notify the driver that the tracking control is released and releases the tracking control at step S220, and then terminates the tracking judgment process.

Figure 6E:
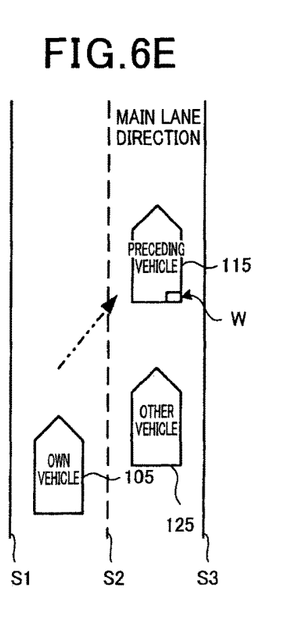

At step S180, it is determined whether or not a lateral vehicle exists. This process serves as a function of a lateral vehicle determining block 17. As shown in FIG. 6E, when the preceding vehicle 115 changes the traffic lane and other vehicle 125 running parallel to the own vehicle 105 exists, the process determines that the condition is true. When the process determines that the lateral vehicle exists (S180: YES), the process proceeds to step S210 so as to notify the driver that the tracking control is released, releases the tracking control at step S220 and terminates the process. In this case, with reference to an example as shown in FIG. 6E, this is because the own vehicle 105 cannot change traffic lane when the preceding vehicle 115 changes its traffic lane. Meanwhile, when a lateral vehicle does not exist (S180: NO), the process proceeds to step S190.

At step S190, it is determined whether or not the tracking control should be maintained. This process is to confirm whether or not the driver intends to maintain the tracking control involving a traffic lane change. Specifically, the process notifies the driver with a message "Continue tracking control?" indicated by a display device (not shown) or a sound device so as to prompt the driver to operate an input operation. The operation determining block 18 serves as a function that determines the input operation of the driver. When it is determined that the driver intends to continue tracking the preceding vehicle (S190: YES), the process proceeds to step S200 and maintains the tracking control, and then terminates the tracking judgment process. Meanwhile, it is determined that the driver does not intend to continue tracking the preceding vehicle (S190: NO), the process proceeds to step S210 so as to notify the driver that the tracking control is released and releases the tracking control at step S220, and then terminates the tracking judgment process.

The steps S220 to S220 serve as a function of the tracking control unit 19. As notification of the releasing the tracking control at step S210, a message such as "tracking control will be released" can be indicated by a display device (not shown), however, the notification may be notified by a sound device.

Figure 4:
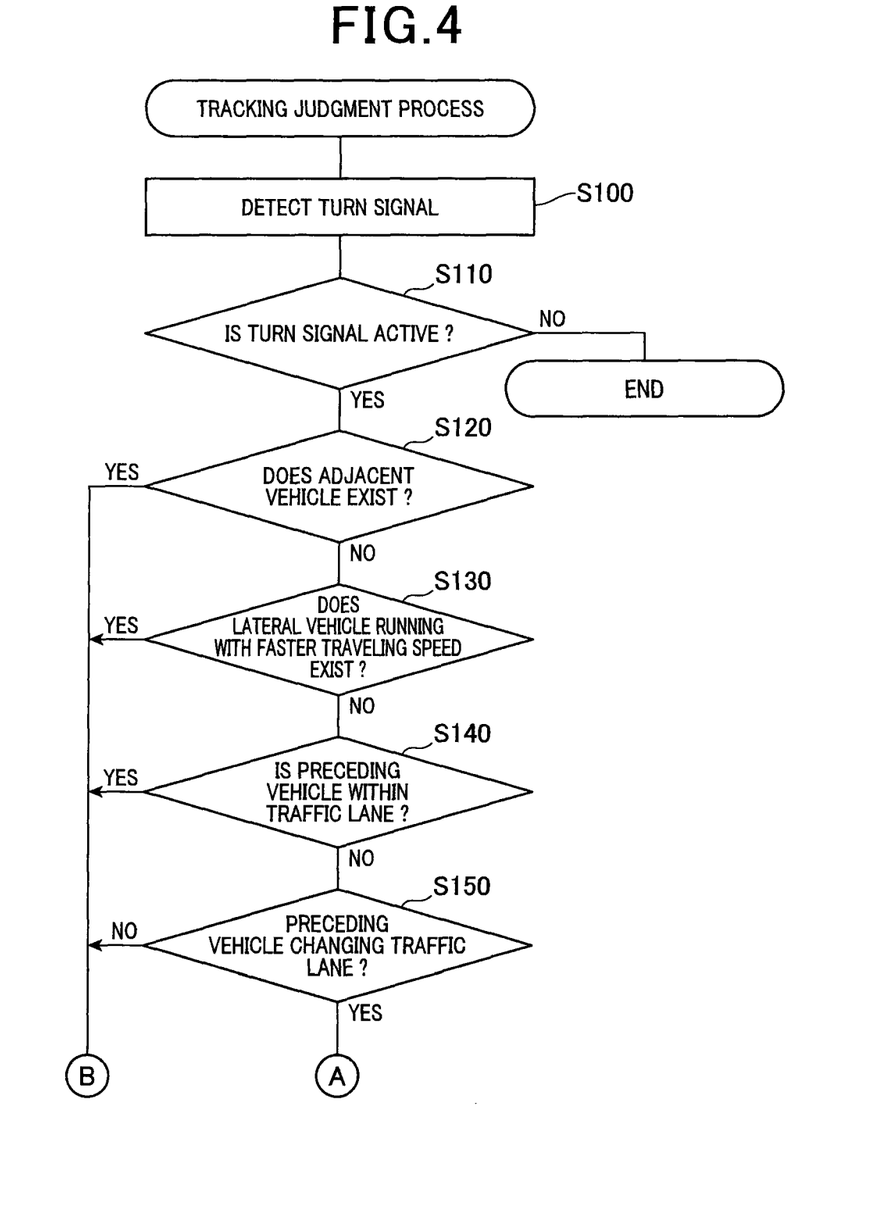
FIG. 4 is a flowchart showing a first half part of the tracking judgment process.

Next, advantages of the on-vehicle tracking control apparatus according to the embodiment is given as follows. According to the embodiment, in the on-vehicle tracking control apparatus, the turn signals of the preceding vehicle is detected (S100 as shown in FIG. 4). When the process determines that the turn signal is active (S110: YES), the process determines whether or not a change of the traffic lane by the preceding vehicle is prevented (S120, S130). If the change of the traffic lane has been prevented (S120: YES, S130: YES), the process maintains the tracking control (S200). Further, when the preceding vehicle changes the traffic lane after determining the turn signal is active (S110: YES, S150: YES), the process identifies types of changing traffic lane and determines whether or not a change of the traffic lane by the own vehicle is prevented so as to determine whether or not the driver intends to maintain the tracking control (S160, S180, S190 as shown in FIG. 5), whereby the tracking control is maintained or released (S200, S220). That is, according to the embodiment, the tracking control is maintained or released by taking into account the surroundings of the own vehicle based on the information concerning the preceding vehicle changing the traffic lane. As a result, after acquiring the information concerning the turn signal units of the preceding vehicle, the tracking control can be reliably maintained or released based on the information concerning relationships between the own vehicle and other vehicles.

Specifically, when the process determines that the turn signal of the preceding vehicle is active (S110: YES as shown in FIG. 4) and determines that other vehicle on the adjacent lane, running parallel to the preceding vehicle exists (S120: YES), the tracking control is maintained (S200 as shown in FIG. 5). That is, the on-vehicle tracking control apparatus includes the preceding vehicle detector 30 and the adjacent vehicle determining block 13 in order to determine whether or not other vehicle running parallel to the preceding vehicle exists. When the tracking control unit 19 judges that the turn signal determining block 15 determines an active turn signal and the adjacent vehicle determining block 13 determines other vehicle exists, the tracking control is maintained. As a result, when the change of the traffic lane by the preceding vehicle is disturbed, the tracking control is maintained. Therefore, the tracking control can be reliably maintained based on the information concerning relationships between the own vehicle and other vehicles.

Specifically, when the turn signal of the preceding vehicle is active (S110: YES as shown in FIG. 4) and a lateral vehicle having traveling speed faster than that of the own vehicle exists (S130: YES), the tracking control is maintained (S200 as shown in FIG. 5). That is, the on-vehicle tracking control apparatus includes the lateral vehicle detector 60 and the lateral vehicle determining block 17 for determining other vehicle running parallel to the own vehicle. The tracking control unit 19 maintains the tracking control when an active turn signal is detected by the turn signal determining block 15 and the lateral vehicle determining block 17 determines that another vehicle exists which is likely to prevent a change of a running direction of the preceding vehicle. As a result, when the change of the running direction of the preceding vehicle is prevented, the tracking control is maintained. Therefore, the tracking control can be reliably maintained based on the information concerning relationships between the own vehicle and other vehicles.

According to the embodiment, even when the preceding vehicle changes the traffic lane (S150: YES as shown in FIG. 4), the tracking control is maintained in principle. In particular, the on-vehicle tracking control apparatus includes the traffic lane detector 50 that detects the traffic lane where the own vehicle is running and the traffic lane identifying block 16. The tracking control unit 19 maintains the tracking control when the preceding vehicle changes its traffic lane from the own lane where the own vehicle is running which is detected by the traffic lane identifying block 16 to other traffic lane.

At this point, the running path estimation block 14 records the location at which the preceding vehicle runs as history data, and estimates the running path of the preceding vehicle. Then, the running path estimation block 14 determines whether or not the preceding vehicle is within the traffic lane (S140 as shown in FIG. 4). When the preceding vehicle is within the traffic lane (S140: YES), the tracking control is maintained (S200 as shown in FIG. 5). In particular, the on-vehicle tracking control apparatus includes the preceding vehicle detector 30 and the running path estimation block 14. The tracking control unit 19 maintains the tracking control while the preceding vehicle is within the own traffic lane based on the running path estimated by the running path estimation block 14. As a result, the traffic control can be reliably maintained even when the road is curved.

Further, when the preceding vehicle changes the traffic lane (S150: YES as shown in FIG. 4) and moves towards the ramp way direction (S160: YES as shown in FIG. 5), the tracking control is released in principle. However, even when the preceding vehicle moves towards the ramp way direction, if the traveling route of the own vehicle indicates the ramp way direction similar to that of the preceding vehicle (S170: YES as shown in FIG. 5), the tracking control is maintained. In particular, the on-vehicle tracking control apparatus includes the own vehicle location detector 20 and the route searching block 11 which searches a traveling route from a current location to a destination. The tracking control unit 19 maintains the tracking control even when the preceding vehicle moves towards the ramp way direction if the traveling route which is searched by the route searching block 11 indicates towards the ramp way direction. As a result, the traffic control can be reliably maintained or released even when the preceding vehicle moves towards the ramp way direction.

Furthermore, when the preceding vehicle changes the traffic lane (S150: YES as shown in FIG. 4) and other vehicle running parallel to the own vehicle exists (S180 as shown in FIG. 5), the tracking control is released (S220). In particular, the on-vehicle tracking control apparatus includes the lateral vehicle detector 60 and the lateral vehicle determining block 17. The tracking control block 19 releases the tracking control when the preceding vehicle changes the running direction and the lateral vehicle determining block 17 determines that other vehicle exists. As a result, the tracking control can be reliably released when the running direction of the own vehicle (i.e., traffic lane change) is prevented.

Regarding continuation or releasing the tracking control involving a change of traffic lane, the driver's intention is determined at step S190 as shown in FIG. 5. In particular, the on-vehicle tracking control apparatus includes the operation detector 70 for determining the driver's intention and the operation determining block 18. The tracking control unit 19 releases the tracking control when the preceding vehicle changes the running direction and the operation determining block 18 determines that the driver intends to release the tracking control. As a result, the tracking control involving a change of the running direction can be reliably maintained or released.

Moreover, in the on-vehicle tracking control apparatus according to the embodiment, the turn signal determining block 15 detects whether or not a turn signal is active based on the information including a position of the turn signal unit, a pattern of the flashing (an interval of the flashing) and the color of the turn signal unit (S100 and S110 as shown in FIG. 4). As a result, the turn signal determining block 15 accurately determines whether or not the turn signal of the turn signal unit is active so that misdetection of the turn signal can be reduced. It is noted that the turn signal determining block 15 may determine whether or not the turn signal is active based on all three of these kinds of information, however, the turn signal determining block 15 may be configured to determine whether or not the turn signal is active based on at least one item of information among the position of the turn signal unit, the pattern of the flashing and the color of the turn signal unit.

The present disclosure is not limited to the above-described embodiments, however, various modifications can be made without departing technical scope of the present disclosure. According to the above-described embodiment, the on-vehicle tracking control apparatus is provided with the running path estimation block 14 and determines whether or not the preceding vehicle is within the traffic lane (S140 as shown in FIG. 4), and maintains the tracking control when the preceding vehicle is within the same traffic lane (S140: YES). As a result, even on a curved road, the on-vehicle tracking control apparatus can promptly determines whether or not the preceding vehicle is running within the traffic lane. Since the tracking control is maintained while a change of the traffic lane is not detected (S150: NO as shown in FIG. 4, S200 as shown in FIG. 5), a process in the running path estimation block 14 and a process by the running path estimation block 14 can be omitted.

What is claimed is:

1. A tracking control apparatus mounted on an own vehicle for performing a tracking control of a preceding vehicle, the tracking control apparatus comprising:
an information acquiring unit acquiring information about surroundings of the own vehicle, the information acquiring unit including a preceding vehicle determining unit determining the preceding vehicle running ahead of the own vehicle;
a control unit controlling the tracking control of the preceding vehicle determined by the preceding vehicle determining unit, the control unit controlling the tracking control to be maintained or released, the tracking control being performed by controlling a travelling speed and a steering of the own vehicle; and
a turn signal determining unit determining whether or not a turn signal of a turn signal unit of the preceding vehicle is active, wherein
the control unit is configured to maintain or release the tracking control by taking into account the surroundings of the own vehicle concerning a traffic lane change by the preceding vehicle based on the information acquired by the information acquiring unit, when the turn signal determining unit determines that the turn signal of the turn signal unit is active;
the control unit is configured to maintain the tracking control when the turn signal determining unit determines the turn signal of the turn signal unit is active and determines that the surroundings of the own vehicle indicate that a change of a running direction of the preceding vehicle is prevented based on the information about the surroundings of the own vehicle acquired by the information acquiring unit;

the information acquiring unit includes an adjacent vehicle determining unit determining whether or not the surroundings of the own vehicle include an adjacent vehicle running parallel to the preceding vehicle exists, the control unit is configured to maintain the tracking control when the turn signal determining unit determines the turn signal of the turn signal unit is active and the adjacent vehicle determining unit determines that the adjacent vehicle exists, the adjacent vehicle preventing the traffic lane change by the preceding vehicle; and the information acquiring unit includes a lateral vehicle determining unit determining whether or not a lateral vehicle running parallel to the own vehicle exists and determining whether or not the lateral vehicle is running faster than the own vehicle, and the control unit is configured to maintain the tracking control when the turn signal determining unit determines that the turn signal of the turn signal unit of the preceding vehicle is active and the lateral vehicle determining unit determines that the lateral vehicle exists and is running faster than the own vehicle, thereby determining that the traffic lane change by the preceding vehicle is disturbed based on the turn signal determining unit determining that the turn signal of the turn signal unit of the preceding vehicle is active and the lateral vehicle determining unit determining that the lateral vehicle exists and is running faster than the own vehicle.

2. The tracking control apparatus according to claim 1, wherein the information acquiring unit includes a traffic lane identifying unit identifying a traffic lane where the own vehicle runs, and the control unit is configured to maintain the tracking control when the preceding vehicle changes the traffic lane identified by the traffic lane identifying unit to an other traffic lane.

3. The tracking control apparatus according to claim 2, wherein the information acquiring unit includes a running path estimation unit estimating a running path of the preceding vehicle, and the control unit is configured to maintain the tracking control while the preceding vehicle is within the traffic lane where the own vehicle runs, based on the running path estimated by the running path estimation unit, the running path estimation unit estimating the running path before the preceding vehicle changes the traffic lane.

4. The tracking control apparatus according to claim 2, wherein the control unit is configured to release the tracking control when the preceding vehicle changes the traffic lane and moves towards a ramp way direction.

5. The tracking control apparatus according to claim 4, further comprising a route searching unit searching a traveling route from a current location of the own vehicle to a destination, wherein the control unit is configured to maintain the tracking control when the traveling route searched by the route searching unit is towards the ramp way direction even when the preceding vehicle moves towards the ramp way direction.

6. The tracking control apparatus according claim 2, wherein the information acquiring unit includes a lateral vehicle detecting unit detecting whether or not a lateral vehicle running parallel to the own vehicle on an adjacent traffic lane exists, and the control unit is configured to release the tracking control when the preceding vehicle changes the traffic lane and the lateral vehicle detecting unit detects the lateral vehicle exists.

7. The tracking control apparatus according to claim 2, further comprising an intention determining unit determining driver's intention, and the control unit is configured to release the tracking control when the preceding vehicle changes the traffic lane and the intention determining unit determines that the driver intends to release the tracking control.

8. The tracking control apparatus according to claim 1, wherein the turn signal determining unit is configured to determine whether or not the turn signal of the turn signal unit is active based on at least one of a position of the turn signal unit, a pattern of flashing and a color of the turn signal unit.

9. The tracking control apparatus according to claim 1, further comprising a tracking apparatus used for the tracking control.

10. The tracking control apparatus according to claim 1, wherein the tracking control of the preceding vehicle operates when the own vehicle is running on an expressway having a slow lane and a fast lane.

11. The tracking control apparatus according to claim 1, wherein the adjacent vehicle determining unit determines whether or not the adjacent vehicle is located adjacent the preceding vehicle.

12. The tracking control apparatus according to claim 11, wherein the control unit determines that the change of the running direction is prevented due to the existence of the adjacent vehicle.

13. The tracking control apparatus according to claim 1, wherein the control unit determines that the change of the running direction is prevented due to the existence of the adjacent vehicle.

* * * * *